INVENTOR.
Joseph Thomas EGAN,
BY Roberts, Cushman & Grover,
Att'ys.

March 14, 1961 J. T. EGAN 2,974,547
SPEED CHANGE MECHANISM
Filed March 3, 1960 4 Sheets-Sheet 3

INVENTOR.
Joseph Thomas EGAN
BY
Roberts, Cushman & Grover
Att'ys.

March 14, 1961   J. T. EGAN   2,974,547
SPEED CHANGE MECHANISM

Filed March 3, 1960   4 Sheets-Sheet 4

INVENTOR.
Joseph Thomas EGAN,
BY
Roberts, Cushman & Grover,
Att'ys.

United States Patent Office 2,974,547
Patented Mar. 14, 1961

2,974,547

SPEED CHANGE MECHANISM

Joseph Thomas Egan, 47 Chestnut St., Marblehead, Mass.

Filed Mar. 3, 1960, Ser. No. 12,553

15 Claims. (Cl. 74—796)

The field of this invention is that of transmission mechanisms and the invention relates more particularly to friction-drive, speed-change devices.

Objects of this invention are to provide a transmission mechanism which has axially-aligned, input and output shafts, which does not have backlash or lost motion between its members, which can be inexpensively constructed and operated, which has low friction loss, which generates very little heat, which distributes wear when the output shaft is stalled, and in which relative motion of drive members results primarily in rolling frictional contacts.

Further objects of this invention are to provide a friction-drive transmission which has a differential action and can be used as a speed-change device, as a friction clutch or as a torque limiting device; which can accomplish high ratio speed reduction without danger of self-destruction due to stalling of the output shaft for short periods of time; which is not subject to random variation of speed-change ratio; which has adjustable torque transmission capacity which can be adjusted without variation of the speed-change ratio; and in which adjustment of torque transmission capacity or uncoupling can be accomplished with application of low forces. Other objects of this invention are to provide such a device which is of small physical size, which is of simple and inexpensive construction, and in which transmission drive members are mutually engaged in rolling frictional engagements for transmitting driving motion between said members and for substantially supporting said members so that minimal supplementary bearing support of said members is required.

In another aspect of this invention, further objects are to provide a variable speed transmission with which speed-change ratios can be varied through a wide ratio range including a smooth and repeatable ratio transition through zero transmission output speed; in which very small forces can be used for accomplishing variation of speed-change ratios; which does not waste substantial power in or near the zero transmission output condition; which has low output inertia; which is adaptable to many types of feedback; in which the output shaft is effectively locked against rotation when in or near zero transmission output condition whether or not the output shaft is driven; and in which speed-change ratios can be rapidly varied, even for reversing the direction of output shaft rotation, with minimum risk of injury due to slippage between transmission members.

Briefly described, the transmission mechanism provided by this invention comprises three transmission members, each of which has a surface disposed so that the surfaces define an annular path. Two of the members are mounted for rotation on the axis of the path and the third member is fixed as a reaction member. Rollable means are disposed within the path so that corresponsively rotatable portions of said means are in rolling frictional engagement with two of the members respectively, and intermediate rollable elements are drivably connected with the third of the members for movement through the annular path, the intermediate rollable elements being in rolling frictional engagement with the rollable means for holding the corresponsively rotatable portions of said means in said rolling frictional engagements. In this construction driving rotation of one of the rotatably mounted members epicyclically drives the rollable means and the intermediate rollable elements for driving the other rotatably mounted member at a speed determined by the diameter ratio of said corresponsively rotatable portions of the rollable means.

In one aspect of this invention there is provided a fixed-ratio speed-change mechanism comprising a pair of cup-shaped transmission members, each having an inwardly facing conical surface, which are disposed with said surfaces in spaced, but facing, coaxial relation, and a transmission shaft member, having an outwardly facing conical surface, which is disposed on the same axis for defining an annular path between the conical surfaces of the members. Rollable means, preferably comprising a cluster of rollable elements such as balls, are disposed within the path so that corresponsively rotatable portions of each element are in rolling frictional engagement with the conical surfaces of respective cup-shaped transmission members. A cluster of intermediate rollable elements corresponding in number to the first-named rollable elements are disposed in the path in rolling frictional engagement with the conical surface of the shaft member. The intermediate rollable elements are disposed in the path in alternate relation to the first-named rollable elements and are of a shape and size, preferably comprising circumferentially-grooved frusto-conical elements, so that each intermediate element is in rolling frictional engagement with two elements of the other cluster of rollable elements for interlocking both clusters within the path. In this construction two of the transmission members are mounted for rotation on the axis of the path while the third member is fixed as a reaction member, whereby driving of a rotatably mounted member as an input member epicyclically drives the clusters of rollable elements within the path for frictionally driving the other rotatably mounted or output member at an input-output speed ratio determined by the diameter ratio of the corresponsively rotatable portions of the balls or other rollable elements engaging the cup-shaped transmission members.

In a preferred embodiment of this invention, frictional engagement of the clusters of rollable elements are adapted to constrain each individual element for rotation on a single, unambiguous, internal axis and the axes of rotation of all conical elements are adapted to intersect the shaft member axis at a common point, thereby to prevent slippage between components of this device and to prevent random variation of speed-change ratio. In a practical embodiment of this invention, adjustable means are provided for biasing the shaft member for axial movement, whereby relatively small forces can be applied to said means for accomplishing proportionally-amplified loading of each point of frictional engagement within the device, thereby to vary torque transmitted by the device without introducing speed-change ratio variation.

In another aspect of this invention there is provided a variable speed transmission device comprising a fixed reaction member or ring and a rotatably-mounted, driven, output member or ring which are disposed in spaced, coaxial relation, and a driving, input member or shaft which is disposed on the axis of the driven and the reaction members for defining an annular path therebetween. Each of the driven and reaction members has an inwardly facing surface and rollable means, for example a plurality of rollable elements such as balls, are disposed within the path so that at least one ball is in rolling frictional engagement with each inwardly facing surface of said members. Speed-varying rollable elements, each having two tapered portions, are mounted on the driving member for movement through the annular path and for free rotation on axes which are inclined relative to the driving member axis outside of the plane of the driving member axis, the speed-varying elements being proportioned and mounted so that respective tapered portions of each element are in rolling frictional engagement with a ball engaging each of the driven and reaction members. Intermediate rollable elements are mounted on the driving member for movement through the path and for free rotation on internal axes, each intermediate element, which preferably has a pair of spaced but facing, conical surfaces, being in rolling frictional engagement with respective balls engaging the driven and reaction members for holding the balls in their frictional engagements. Means are provided on the driving members which are adapted to move the speed-varying elements along the driving member axis whereby the tapered portions of said elements can be moved relative to the balls engaged by said elements. In this construction driving or input member rotation epicyclically drives the balls, the speed-varying elements, and intermediate rollable elements within the path so that the speed-varying elements are frictionally driven for rotation on internal axes by the balls engaging the reaction member. The speed-varying elements, in turn, frictionally drive the balls engaging the driven member for rotating the driven member at an input-output speed ratio which is determined by the ratio of diameters of the tapered portions of each speed-varying element engaged by balls.

A detailed description of the specific embodiments of this invention which follows refers to drawings in which.

Figures 1, 2:
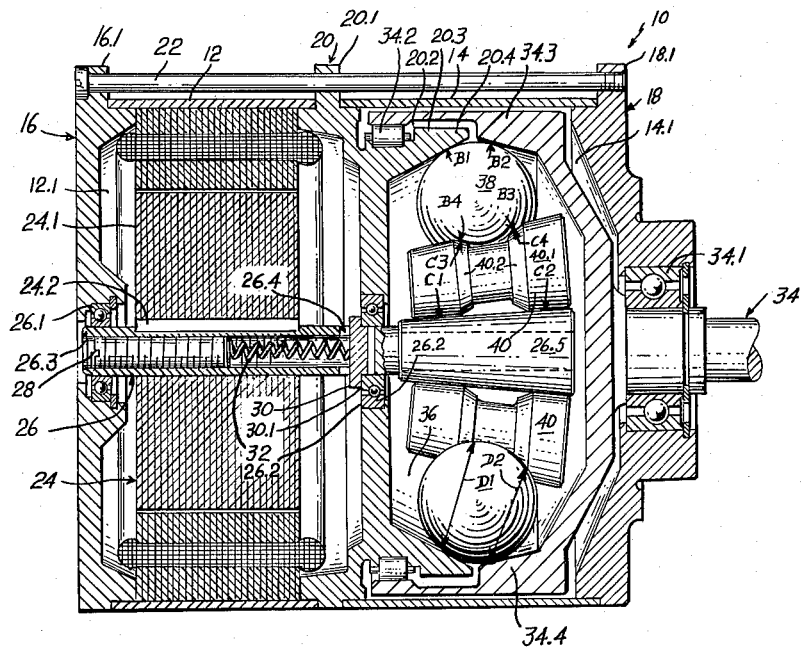
Fig. 1 is a section view along the input-output axis of a fixed-ratio speed-change device provided by this invention.
Fig. 2 is a diagrammatic view along line 2—2 of Fig. 1.
Figure 3:
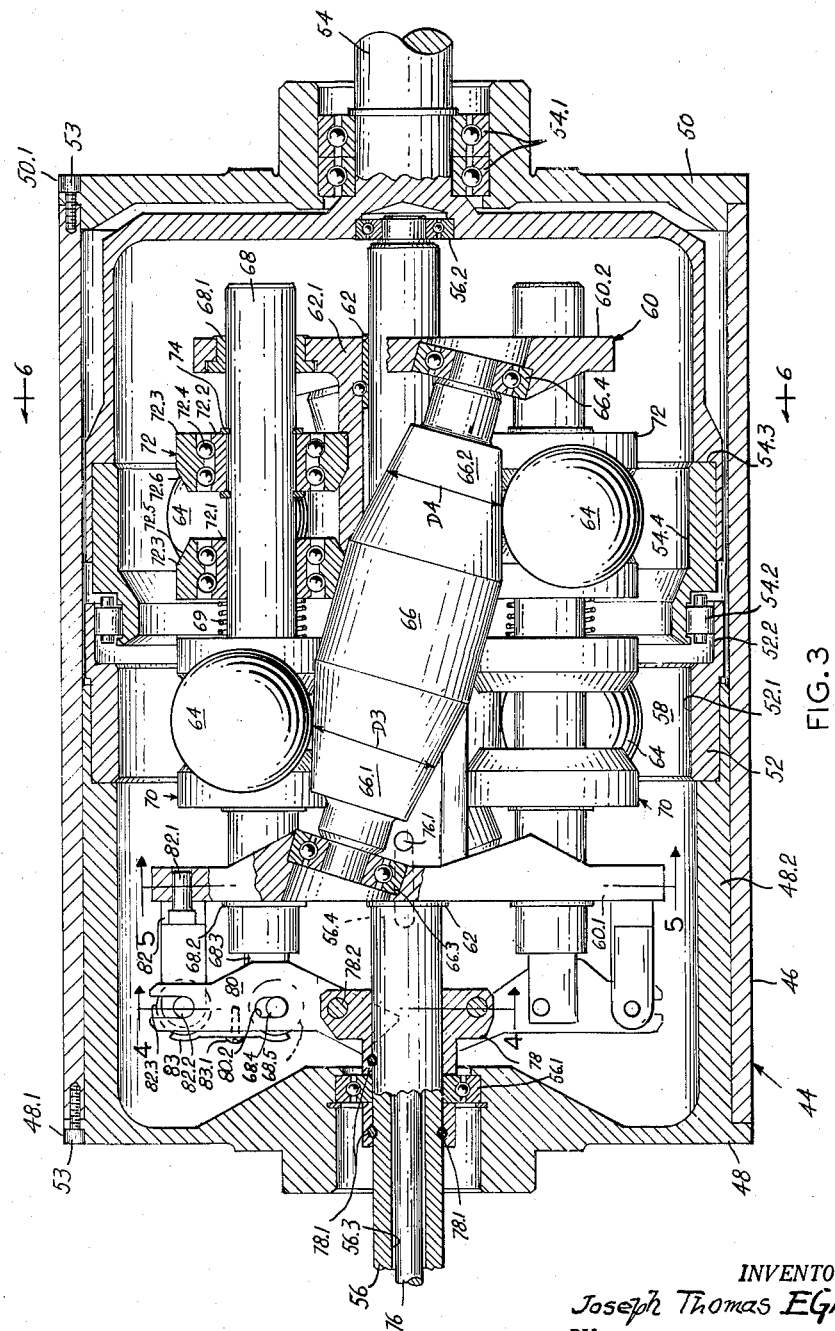
Fig. 3 is a section view along the input-output axis of a variable speed transmission device provided by this invention.
Figure 4:
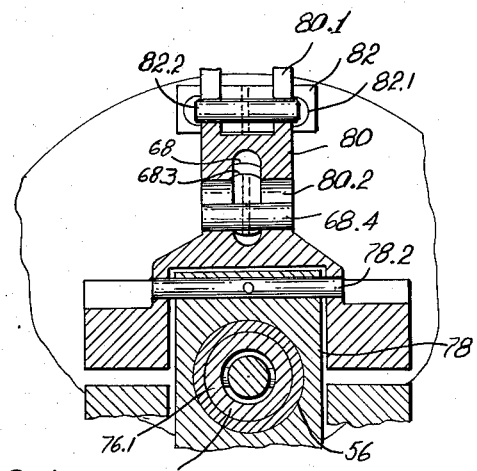
Fig. 4 is a partial section view along line 4—4 of Fig. 3.
Figure 5:
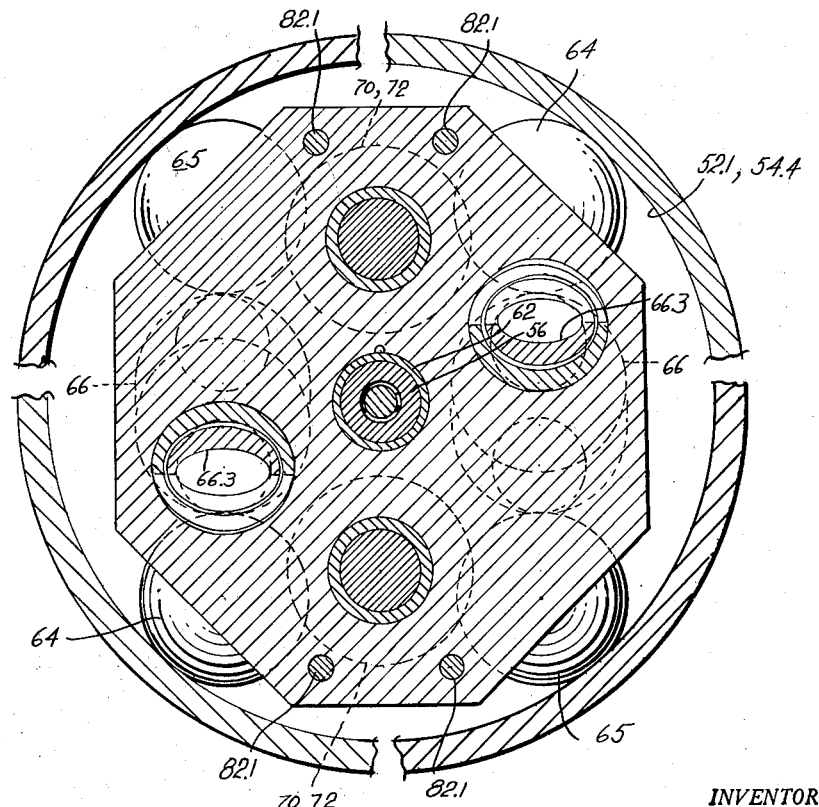
Fig. 5 is a section view along line 5—5 of Fig. 3.
Figure 6:
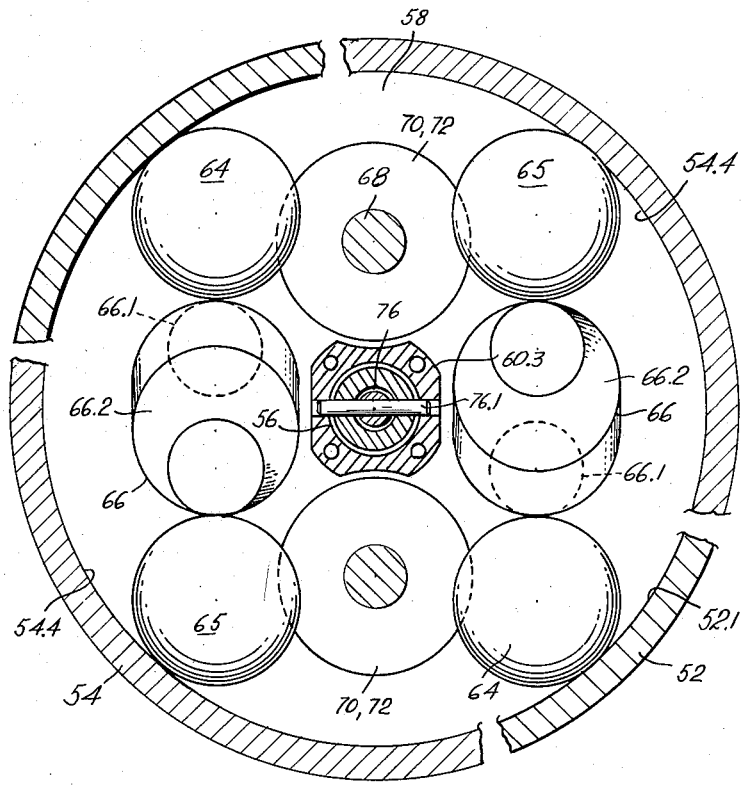
Fig. 6 is a diagrammatic view along line 6—6 of Fig. 3.

Referring to the drawings Figs. 1 and 2 illustrate an embodiment of this invention which is adapted to provide fixed-ratio speed-change in a novel and advantageous manner. As illustrated the device incorporates the frame 10 including hollow cylindrical enclosure sections 12 and 14, end plates 16 and 18, and a center plate 20 separating the enclosure sections to divide the frame into two housing chambers 12.1 and 14.1. Tie rods 22, only one of which is shown, are spaced around the frame and are fitted into bosses 16.1 and 18.1 and 20.1 on respective frame plates for holding the frame components in assembled relation. An electric motor 24 of suitable design is secured within the frame housing chamber 12.1 in conventional manner.

An input shaft or driving member 26 is mounted for rotation in bearings 26.1 and 26.2 in the end plate 16 and the center plate 20 respectively, and is connected to the rotor 24.1, for example by a key 24.2, so that the driving member is rotatably driven by the motor but is adapted for axial movement within the rotor, alternatively the rotor can be mounted for axial movement in any suitable manner, and the shaft member 26 can be keyed to the rotor for movement therewith. The driving member shaft is axially bored and threaded, as at 26.3, to receive an adjusting screw 28, and is slotted, as at 26.4, at the base of the threaded bore to receive a key 30. The key has portions 30.1 extending from the slot 26.4 for engaging the driving member bearing 26.2 and contacts the helical coil compression spring 32 disposed in the shaft bore for biasing the driving member to the left as shown in Fig. 1. As will be understood adjustment of the screw 28, which is accessible from outside the frame 10, is effective to adjust the biasing force exerted by the spring 32 for a purpose to be described below. The driving member has a portion 26.5 of outwardly flaring frusto-conical configuration which extends into the frame chamber 14.1.

An output shaft or driven member 34 is mounted in coaxial relation to the driving member 26 for rotation in bearings 34.1 in the end plate 18 and may also be supported by roller bearings 34.2 which are adapted to rotate in a race 20.2 formed in the center plate 20 if desired. The driven member includes the cup-shaped portion 34.3 which is disposed in frame chamber 14.1 and which is provided with an inwardly facing, preferably conical, surface 34.4.

The center plate is also provided with a cup-shaped flange portion 20.3 having an inwardly facing, preferably conical, surface 20.4, and is disposed so that the flange extends into the frame chamber 14.1 in coaxial relation to the driving and driven members. The flange of the center plate is adapted to serve as a reaction member as will be described below.

As shown the conical surfaces of the driving, driven and reaction members define an annular path 36 therebetween. Within this path there is disposed a plurality of roller elements 38, preferably balls as shown, each of which has correspondingly rotatable portions, indicated by arrows D1 and D2, in rolling frictional engagement with the surface 20.4 of the reaction member and with the surface 34.4 of the driven member respectively. Also within the path there is disposed a plurality of intermediate rollable elements 40, preferably of frusto-conical shape, each of which is drivably connected with the driving member 26 by being in rolling frictional engagement with the conical portion 26.5 thereof. Each of the cone-shaped elements 40 has a circumferential groove or guide portion of reduced diameter 40.1 intermediate its end and each groove is provided with a pair of shoulders 40.2, preferably of conical shape, which are concentric with the element axis and are arranged in opposed relation. The elements 38 and 40 are alternately disposed within the path 36 as shown in Fig. 2 so that each ball 38 is fitted in rolling frictional engagement with the shoulders of the grooves of two of the cone-shape elements 40, thereby interlocking the ball and cone-shape elements in spaced relation within the path entirely by means of rolling frictional engagements. For this purpose it is required that the embodiment of this invention illustrated in Figs. 1 and 2 incorporate clusters of at least three outer elements such as the balls 38 and three intermediate roller elements such as the cone-shaped elements 40.

In this construction, the balls 38 and the intermediate elements 40 are rotated on internal axes and are epicyclically driven through the path 36 by driving or input member rotation and by frictional engagement of the balls 38, with the surface 20.4 of the fixed reaction flange 20.3, whereby the driven member 34 is also rotatably driven by frictional engagement of the balls 38. However, the portions of the various balls, elements, and members of the device can be selected so that the correspondingly rotatable portions of the balls engaging the driven and reaction members can be of different diameter, as indicated at D1 and D2 in Fig. 1, whereby output speed of the driven member will be in ratio to input speed of the driving member as determined by the ratio of diameters of said correspondingly rotatable portions of the balls. It can be seen that each ball 38 is retained within the path 36 entirely by means of frictional engagements of the ball with the reaction and driven member, as indicated by the arrows B1 and B2 respectively, and with two shoulders, as indicated by arrows B3 and B4 respectively, of each of two intermediate elements 40. Similarly each intermediate element 40 is retained within the path by frictional engagement of the element with the driving member, as indicated by arrows C1 and C2, and with two portions, as indicated by arrows C3 and C4 respectively, of each of two balls 38. Preferably the balls and elements are proportioned relative to the driving, driven and reaction members so that torque and compressive forces exerted on the balls and intermediate elements at said points of frictional engagement under normal conditions positively position the balls and elements within the path, as illustrated particularly in Fig. 2, so that torque exerted at all of said points on the intermediate elements 40 and everyone of said points except that one indicated by arrow B2 on the balls 38 constrain each ball and element for rotation in a single, unambiguous, internal axis. For this purpose, it is preferred that the device provided by this invention incorporate at least three and preferably five balls 38 and intermediate elements 40. Preferably also the internal axes of rotation of the balls intersect at a common point and the internal axes of rotation of each frusto-conical element are adapted to intersect the centrally located driving member axis at a common point, which points may be at infinity. It should be understood that, although in the embodiment of the invention illustrated in Figs. 1 and 2, the balls 38 and the intermediate frusto-conical elements 40 are related as outer and inner clusters respectively, with the balls engaging a pair of outer members and the intermediate elements engaging a single inner member, the relationship of the balls and intermediate elements could be inverted with the intermediate elements engaging a single outer member and with the balls engaging a pair of inner members within the scope of this invention. In such a construction, it would also be preferred that the internal axes of rotation of each of the frusto-conical elements intersect the common axis of the inner members at a common point, which point could also be at infinity. Preferably, but not necessarily, the balls and intermediate elements are composed of hardened or stainless steels, and the driving, driven and reaction members are made of similar materials or are provided with inserts, not shown, of such materials along the wear surfaces thereof.

Where the axes of rotation of the balls intersect at a common point the axis of rotation of the intermediate elements intersect the driving member axes at a common point, each ball and element contributes equally with every other ball and element to the transmission of power between the driving and driven members. Similarly where torque forces exerted on the balls and intermediate elements normally constrain the balls and elements for rotation on unambiguous axes, random variation of the ratio of speed-change effected by this device is substantially restricted even though driven member loading is varied so that ball-skewing forces exerted at point B2 on the balls 38 vary to a certain extent. Further where the driven member is stalled, axially loaded or overloaded so that torque exerted on each ball at points B1, B2, or both, is substantially increased, any resulting slippage will accrue at points B1, B2, or both, without skewing the axis of ball rotation. Therefore wear caused by such slippage will be distributed around the balls along lines of engagement with said points and will not cause spot wearing of the balls.

For altering the output torque limit the screw 28 can be adjusted to change the bias exerted on the driving member 26 by spring 30, whereby the compressive forces, and therefore the torque forces, exerted on the balls and elements 40 can be proportionally reduced or amplified as desired to select the maximum output torque which can be delivered by the device without permitting slippage at points B1 or B2 and resulting variation of the speed-change ratio or stalling of the output shaft. Where the apex angle of the conical portion 26.5 of the driving member is small, very small biasing forces are effective to exert substantial compressive forces on the balls 38, whereby wide range of output torque adjustment can be achieved with this device.

It should be understood that, although the two clusters of rollable elements disposed within the path 36 comprise balls and frusto-conical elements in the illustrated embodiment of this invention, other cooperable shapes and sizes of rollable elements adapted to be interlocked within the path 36 by means of rolling frictional engagements could be utilized within the scope of this invention. Further, although the shaft 26 and the cup-shape transmission members 20.3 and 34 have been mounted and characterized as driving, reaction and driven members respectively, it should be understood that each of the members could be adapted to perform the driving, driven or reaction function as desired. Also, although the driving, driven and reaction members as shown are each provided with supporting means independent of the support afforded by the clusters of rollable elements, the members and elements could be proportioned and arranged so that the clusters of rollable elements would function as a bearing support for the transmission members within the scope of this invention. Further the illustrated means for adjusting the bias exerted on the shaft member 26 is merely the preferred means for accomplishing this purpose and other similar means well known to the art are within the scope of this invention.

In Figs. 3–6 there is illustrated a variable speed transmission 42 provided by this invention. The variable speed device includes a frame 44 comprising a hollow cylindrical enclosure tube 46 and end plates 48 and 50. The end plates are flanged at 48.1 and 50.1 to receive screws 53 by means of which the frame components are held in assembled relation.

The frame end plate 48 preferably has a cup-shaped portion 48.2 extending within the frame and a ring 52 of hardened or stainless steel is fixedly secured thereto concentric with the frame axis. The ring 52 has an inwardly-facing, cylindrical surface 52.1 which is adapted to serve as a reaction member as will be described below.

A driven or output member 54 is mounted on a frame axis for rotation in the bearings 54.1 in the end plate 50 and if desired can be additionally supported by roller bearings 54.2 adapted to rotate in a race 52.2 in the reaction ring. The driven member is preferably cup-shaped and has a ring 54.3 fixedly secured thereto, the ring having an inwardly-facing, cylindrical surface 54.4 corresponding to the reaction ring surface 52.1.

An input or driving member shaft 56 is mounted on the frame axis for rotation in bearings 56.1 and 56.2 in the end plate 48 and the driven member 54 respectively, thereby to define an annular path 58 between the shaft and the inwardly-facing surfaces 52.1 and 54.4 of the reaction and driven members. The shaft has a cage 60 slidably mounted thereon by means of bearings 62, and bearing anchor pins 62.1, the cage having spaced, radially-extending flange portions 60.1 and 60.2 for a purpose to be described below.

Within the path 58, rollable means 64 and 65, preferably balls as shown, are disposed so that at least one ball, 64 or 65, is in rolling frictional engagement with each of the inwardly-facing surfaces 52.1 and 54.4 of the reaction and driven ring respectively.

Speed-varying rollable elements 66, preferably comprising cylindrical members having tapered conical portions 66.1 and 66.2 at opposite ends, are mounted between the driving member cage flanges 60.1 and 60.2 in bearings 66.3 and 66.4 respectively for movement through the path 58 with rotation of the driving member 56 and for rotation on internal axes which are inclined relative to the driving member axis outside of the plane of the driving member axis. The speed-varying elements are proportioned and mounted so that respective tapered portions of each element are adapted to be in rolling frictional engagement with a ball 64 engaging the reaction ring 52 and with a ball 65 engaging the driven member ring 54.3 along lines of contact which extend parallel to the driving member axis.

Shaft members 68 are slidably mounted in bearings 68.1 and 68.2 in the cage flanges 60.1 and 60.2 respectively, and each shaft has two intermediate rollable elements, 70 and 72, mounted thereon. Each intermediate rollable element 72 comprises a pair of inner race members 72.1 and 72.2, one of which, 72.2, nearest the shaft end is fixedly secured to the shaft member by retaining rings 74 and the other of which, 72.1, is slidably mounted on the shaft member. Each inner race member has an outer race member 72.3 rotatably mounted thereon by ball bearings 72.4, and the outer race members have conical surfaces 72.5, 72.6 respectively, which are disposed in spaced, facing relation. Each intermediate rollable element 70 is similarly arranged and a helical coil compression spring 69, mounted on each shaft 68, biases the slidably mounted inner race member of each element 70 and 72 toward its corresponding, fixedly-mounted inner race member. The intermediate rollable elements 70 and 72 are arranged so that the conical surfaces of each element are in rolling frictional engagement with balls 64 and 65 respectively, for holding the balls in rolling frictional engagement with the driven and reaction members respectively.

The driving member 56 is axially bored, as at 56.3, and is slotted, as at 56.4, at the end of said bore. A control rod 76 is slidably fitted within the bore 56.3 and is attached to the central portion 60.3 of the driving member cage 60 by means of the pin 76.1 which extends from the driving member bore through the slot 56.4. A substantially rectangular boss 78 is fixedly secured to the driving member shaft, for example by means of keys 78.1 and pivotally supports a lever 80 for each shaft member 68, as at 78.2. A bracket 82 is secured to the driving member collar flange 60.1 adjacent each shaft member 68 by screws 82.1 and mounts a pivot pin 82.2 which pivotally engages a slot 80.1 in lever 80 nearest thereto. Shaft members 68 are also provided with extensions 68.3 mounting pivot pins 68.4 which are each engaged in a slot 80.2 in respective levers.

In this construction, driving or input member rotation frictionally drives each ball 64 through the path 58 so that frictional engagement of the ball with the reaction ring 52 rotates the ball on an internal axis at a peripheral speed determined by the ring diameter. Each ball 64, in turn, rotates a speed-varying element 66 with which it is engaged so that a ball 65 engaged with that speed-varying element, which is similarly driven through the path 58, is rotated on an internal axis at a peripheral speed determined by the diameter ratio of the tapered portions of the speed-varying element engaged by the balls 64 and 65. It can be seen that where each set of balls 64 and 65 engage tapered portions of a speed-varying element which are of the same diameter, as illustrated by arrows D3 and D4 in Fig. 3, the peripheral speed of the balls 64 frictionally driving the speed-varying elements will be the same as the peripheral speed of the ball 65 frictionally driven by the speed-varying element, and since the reaction and driven member surfaces respectively engaged by the balls 64 and 65 are preferably of the same diameter, output speed of the driven member will be zero. Conversely, where the balls 64 and 65 engage equal diameter portions of the speed-varying elements 66, the output member 54 is effectively locked against rotation whether or not the input member 56 is rotatably driving. However, where the speed-varying elements are moved along the driving member axis relative to the balls so that the balls 64 and 65 are respectively engaged with tapered portions of speed-varying elements which are of different diameter, the peripheral speeds of the balls 64 and 65 engaging the reaction and driven members will also be different so that the driven member will be rotated at an input-output speed ratio corresponding to the diameter ratio of the engaged portions of the speed-varying elements.

For this purpose the control rod 76, which is accessible from the frame exterior, is adapted to be axially slidable in the driving member bore 56.3 for moving the driving member cage 60 along the axis of the driving member shaft. Axial movement of the cage 60 moves the speed-varying elements 66 along the driving member axis to a corresponding degree so that the cage flange brackets 82 rotate the levers 80 on pivots 78.2. However since the shaft members 68 are slidably mounted in the cage flanges 60.1 and 60.2 and are engaged by the levers 80 at points relatively closer to the lever fulcrum 78.2 than the collar brackets, the shaft members and balls restrained by the elements 70 and 72 are moved along the driving member axis to a lesser degree, whereby the balls 64 and 65 are moved relative to the speed-varying elements so that the diameters of the tapered portions of the speed-varying elements engaged by the balls are conveniently varied. Preferably washers 82.3 and 68.5 are fitted over each bracket pivot pin 82.2 and shaft pivot pin 68.4 respectively, and a spring 83 secured to each lever 80 by a screw 83.1 is adapted to bear against the washers for removing play or lost motion of the lever.

Since the rollable elements 64 and 65 are spherical and are positioned entirely by means of rolling frictional engagements with other members or elements, very small forces applied to the control rod 76 will be effective to vary the input-output speed change produced by this device. Further, the forces exerted on the balls 64 and 65 at points of said rolling frictional engagement are adapted normally to constrain the balls for rotation on unambiguous, internal axes, in the same manner as illustrated with reference to Figs. 1 and 2, which axes of rotation may intersect the driving member axis at the same point, at infinity in the illustrated embodiment of this device. Adjustment of speed change ratio effected by movement of the cage 60 in response to movement of the control rod 76 will tend to rotate each ball on a second axis perpendicular to its normal unambiguous axis of rotation to experience similar rolling frictional engagement with a speed-varying element 66 and with either the driven or reaction ring, the two freely rotatable races of whichever intermediate element 70 or 72 is engaged with the ball accommodating rotation on this second axis by rotating at different speeds in rolling frictional engagement with the ball. The resultant ball axis during ratio change is thus due to the vector addition of one angular ball velocity about its normal axis and a second, much smaller, angular ball velocity about an axis perpendicular to said normal axis, each angular velocity causing the ball to experience rolling friction only. Thus, all friction drive surfaces of the ball, whether subjected to driving motion, ratio-adjusting motion or both motions combined, experience rolling friction only so that the apparatus provided by this invention is adapted for long wear and for frequent and rapid ratio adjustment, is adapted to accomplish smooth ratio transition through the zero output speed condition, and can be adapted to provide a wide range of speed ratio with minimum risk of injury to transmission members during ratio variation.

Although certain preferred embodiments of this invention have been described for the purposes of illustration, it should be understood that this invention includes all modifications and equivalents which fall within the scope of the appended claims.

I claim:

1. A transmission device comprising a driving member, a driven member, a reaction member, each member having a surface disposed so that said surfaces substantially enclose an annular path, a cluster of at least three balls within said path each of which is in rolling frictional engagement with said surfaces of two of said members, and a corresponding cluster of conical elements each in rolling frictional engagement with said surface of the third of said members, each of said conical elements having a circumferentially grooved portion intermediate its ends in rolling frictional engagement with two of said balls, said balls and conical elements being disposed alternately within said path in interlocking relation so that said balls and conical elements are retained within said path by said frictional engagements, whereby driving member rotation on the axis of said path will drive the balls and conical elements epicyclically within said path for rotatably driving the driven member on said axis.

2. A transmission device as set forth in claim 1 wherein said frictional engagements of said balls and said conical elements constrain each ball and conical element for rotation on a single internal axis only.

3. A transmission device comprising a pair of transmission members each having an inwardly facing conical surface concentric with a common axis, a shaft member disposed on said axis, said shaft member having a flaring conical surface facing said surfaces of said transmission members for defining an annular path therebetween, at least three balls within said path each in rolling frictional engagement with the surfaces of said transmission members, and a like number of cone-shaped elements in rolling frictional engagement with said surface of said shaft member, each conical element having a circumferential groove with opposed, conically-shaped groove shoulders wedged in rolling frictional engagement with two of said balls, said balls and elements being alternately disposed within said path in interlocking relation so that said balls and elements are supported and retained within said path by said points of rolling frictional engagement whereby rotation of a member on said axis while another member is fixed as a reaction member will drive said balls and elements epicyclically within said path for rotatably driving the remaining member on said axis and will provide substantial support for said member.

4. A transmission device as set forth in claim 3 having means biasing the shaft member axially for proportionally loading each of said points of frictional engagement.

5. A transmission device as set forth in claim 3 having adjustable means biasing the shaft member axially for wedging the conical surface of the shaft member against said cone-shaped elements, thereby to load each of said points of frictional engagement proportionally.

6. A transmission device as set forth in claim 5 wherein said frictional engagements of said balls and cone-shaped elements constrain each ball and cone-shaped element for rotation on a single internal axis only substantially independent of change in load at said points of frictional engagement, said axes intersecting the axis of said shaft member at a common point.

7. A transmission device as set forth in claim 5 wherein said frictional engagement of said balls and cone-shaped elements constrain each ball for rotation on a single internal axis only, said axes of said balls intersecting at a common point, wherein said frictional engagement of said balls and cone-shaped elements constrain each cone-shaped element for rotation on a single internal axis only, said axes of said cone-shaped elements intersecting the axis of said shaft member at a common point, and wherein said balls and cone-shaped elements are restrained for rotation on said axes independently of change in load at said points of frictional engagement.

8. A variable speed transmission comprising a rotatably mounted driving member, a reaction member, a driven member, each of said reaction and driven members having a surface disposed so that said surfaces define an annular path around the driving member axis, at least one spherical element in rolling frictional engagement with each of said reaction and driven member surfaces, a corresponding number of speed-varying rollable elements drivably connected with said driving member for movement through said path, each of said speed-varying elements having two tapered portions respectively disposed in rolling frictional engagement with a spherical element engaging each of the reaction and driven members, a corresponding number of intermediate rollable elements drivably connected with said driving member for movement through said path, each of said intermediate elements being in rolling frictional engagement with respective spherical elements for holding said spherical elements in said frictional engagements, and means for moving said speed-varying elements relative to said spherical elements to select the diameter of the tapered portion of the speed-varying elements engaged by said spherical elements, whereby the driven member is rotated on the axis of said path at a speed determined by the ratio of diameters of said speed-varying element surfaces engaged by said spherical elements.

9. A variable speed transmission comprising a rotatably mounted driving member, a reaction member, a driven member, each of said reaction and driven members having an inwardly facing cylindrical surface disposed so that said surfaces define an annular path concentric with the driving member axis, at least one ball in rolling frictional engagement with each of said reaction and driven member surfaces, a corresponding number of rollable elements each of which is drivably mounted on said driving member for movement through said path and mounted for rotation on an internal axis inclined to and outside of the plane of the driving member axis, each of said rollable elements having a pair of conical surfaces adapted to move through planes parallel to the driving member axis as said elements are moved through said path and are rotated on said internal axes, each conical surface of each rollable element being in rolling frictional engagement with balls engaging said reaction and driven member surfaces respectively, a corresponding number of intermediate rollable elements drivably mounted on said driving member for movement through said path, each of said intermediate elements being in rolling frictional engagement with one of said balls for holding said balls in said frictional engagements, and means moving said first-named elements to select the diameter of said conical surfaces thereof engaged by said balls, whereby the driven member is frictionally driven at a speed determined by the ratio of diameters of said conical surfaces engaged by said balls.

10. A variable speed transmission comprising a rotatably mounted driving member, a reaction member, a rotatably mounted driven member, each of said reaction and driven members having an inwardly facing cylindrical surface concentric with the driving member for defining an annular path therebetween, a plurality of balls in rolling frictional engagement with each of said reaction and driven member surfaces, a corresponding number of rollable elements drivably mounted on said driving member for movement through said path and mounted for rotation on internal axes inclined to said driving member axis, each of said rollable elements having a pair of conical surfaces adapted to move through a plane parallel to the driving member axis as said elements are moved through said path and are rotated on said internal axes, each conical surface of each rollable element being in rolling frictional engagement with balls engaging said reaction and driven member surfaces respectively, a corresponding number of pairs of conical elements drivably mounted on said driving member for movement through said path, each of said pairs of conical elements being in rolling frictional engagements with a ball for holding said balls therebetween in said frictional engagements, and means for moving said first-named rollable elements along said driving member axis to select the diameters of said conical surfaces thereof engaged by said balls.

11. A variable speed transmission as set forth in claim 10 wherein said frictional engagements of said balls constrain each ball for rotation on a single internal axis only.

12. A variable speed transmission comprising a reaction ring; a coaxial, driven ring rotatably mounted in spaced relation to the reaction ring; a driving member rotatably mounted on the axis of said rings for defining an annular path therebetween, a plurality of balls within said path in rolling frictional engagement with each of said rings, said driving member having a cage with a radially extending flange adjacent each ring, rollable elements corresponding in number to said balls mounted between said cage flanges for rotation on axes inclined to said ring axis, each of said elements having a pair of conical surfaces adapted to move through a plane parallel to said ring axis as said elements are rotated, each element having one of said surfaces in rolling frictional engagement with respective balls engaging respective rings, pairs of intermediate conical elements corresponding in number to said balls mounted between said cage flanges for rotation on axes parallel to said ring axis, each of said pairs being in rolling frictional engagement with respective balls for holding said balls therebetween in said frictional engagements, and means for moving said first-named rollable elements relative to said balls to select diameters of said conical surfaces thereof engaged by said balls.

13 A variable speed transmission as set forth in claim 10 wherein intermediate conical elements of said pairs are coaxially mounted in facing relation, wherein respective sets of said pairs holding a ball engaging each ring are mounted for free rotation on a common shaft, said shafts being mounted for sliding axial movement in said cage flanges, and wherein said means for moving said first-named rollable elements relative to said balls comprise means for sliding said cage relative to said shafts.

14. A variable speed transmission as set forth in claim 13 wherein the outer conical elements of said pairs mounted on respective shafts are attached to said shafts for preventing axial movement relative thereto, and wherein the inner conical elements of said pairs are biased for axial movement on said shafts toward corresponding outer conical elements.

15. A variable speed transmission as set forth in claim 13 wherein said means for moving said first-named rollable elements relative to said balls comprises a control rod connected to and rotatable with said driving member cage, said rod being axially movable relative to said driving member for moving said cage along the driving member axis, and lever arms pivotally connected to the driving member and said cage, said arms pivotally engaging an end of respective intermediate conical element shafts between the driving member and cage, whereby movement of the cage along the driving member axis in response to movement of the control rod results in movement of said first-named rollable elements and intermediate conical elements relative to said rings and to each other.

References Cited in the file of this patent
UNITED STATES PATENTS

| | | |
|---|---|---|
| 2,315,486 | Mulder | Apr. 6, 1943 |
| 2,559,230 | Schottler | July 3, 1951 |
| 2,862,407 | Lutz | Dec. 2, 1958 |